(12) United States Patent
Gallagher et al.

(10) Patent No.: US 6,714,688 B1
(45) Date of Patent: Mar. 30, 2004

(54) METHOD AND APPARATUS FOR ENHANCING THE EDGE CONTRAST OF AN INTERPOLATED DIGITAL IMAGE

(75) Inventors: Andrew C. Gallagher, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 634 days.

(21) Appl. No.: 09/710,158

(22) Filed: Nov. 10, 2000

(51) Int. Cl.[7] .................................................. G06K 9/40
(52) U.S. Cl. ...................... 382/266; 382/260; 382/263; 382/274; 382/300
(58) Field of Search ................................. 382/254, 260, 382/261, 263, 264, 266, 272, 274, 299, 300

(56) References Cited

U.S. PATENT DOCUMENTS 5,294,998 A  *  3/1994  Piovoso et al. ............. 382/261
5,880,767 A  *  3/1999  Liu ............................. 347/251
6,005,983 A    12/1999  Anderson et al.
6,580,835 B1 *  6/2003  Gallagher et al. .......... 382/274

* cited by examiner

*Primary Examiner*—Jon Chang
*Assistant Examiner*—Chong Kim
(74) *Attorney, Agent, or Firm*—William F. Noval (57) ABSTRACT

A method for enhancing a digital image channel, the method comprising the following steps:

(a) providing a digital image channel having image pixels;
(b) providing interpolation parameter values;
(c) generating an interpolated digital image channel using the interpolation parameter values and the digital image channel;
(d) generating edge shaper parameter values from the interpolation parameter values; and
(f) generating an enhanced digital image channel from the interpolated digital channel by applying an edge shaping algorithm controlled by the edge shaper parameter values.

43 Claims, 3 Drawing Sheets

METHOD AND APPARATUS FOR ENHANCING THE EDGE CONTRAST OF AN INTERPOLATED DIGITAL IMAGE

FIELD OF THE INVENTION

The invention relates generally to the field of digital image processing and, more particularly, to a method for enlarging the size of a digital image with interpolation and coordinating the edge shaping of the resulting digital image with the characteristics of the interpolation.

BACKGROUND OF THE INVENTION

It is common in the field of digital image processing to increase the resolution of a digital image. For example, suppose that it is desired that a digital image having resolution of 480 by 640 pixels be printed at a size of 3.84 inches by 5.12 inches on a device that prints only 250 dpi (dots per inch.) In this case, if the resolution of the image is exactly doubled, then the final print will be the correct size.

The process of changing the resolution of a digital image (especially when increasing the resolution) is referred to as interpolation. Interpolation is the process of estimating the value of a digital image signal at locations intermediate to the original samples.

The process of digital image interpolation is often performed with bilinear interpolation or bicubic interpolation. Both of these methods do indeed allow for the creation of high resolution digital images from low resolution digital images. However, the resulting high resolution digital image is inferior in quality to an image of the same scene which was originally captured with high resolution. The interpolated image appears to lack detail, the edges appear to be soft, and a jagged artifact due to edge aliasing may occur.

One method of increasing the apparent amount of detail and edge contrast in a digital image is by performing a sharpening operation. Traditional methods of increasing the apparent sharpness of a digital image, such as the technique of unsharp masking, often produce unwanted artifacts at large transition edges in the image. For example, unsharp masking is often described by the equation:

Sproc=Sorg+B(Sorg−Sus)

where Sproc represents the processed image signal in which the high frequency components have been amplified, Sorg represents the original image signal, Sus represents the unsharp image signal, typically a smoothed image signal obtained by filtering the original image, and B represents the high frequency emphasis coefficient.

The unsharp masking operation may be modeled as a linear system. Thus, the magnitude of any frequency in Sproc is directly dependent upon the magnitude of that frequency in the Sorg image signal. As a consequence of this superposition principle, large edges in the Sorg image signal will often display a ringing artifact in the Sproc signal when the desired level of high frequency enhancement has been performed in other areas of the Sproc signal. This ringing artifact appears as a light or dark outline around the large edge, and may be visually objectionable.

Additionally, the optimum parameter values used for the sharpening stage are not independent of the method or amount of interpolation performed on the digital image. Parameter values found to produce good results for an interpolation factor of 2 may yield sub-optimal results for an interpolation factor of 8.

Thus, there exists a need for an alternative method of manipulating a digital image that has undergone an interpolation process in order to generate an image signal that appears to be sharper, or more in focus and while minimizing the ringing artifact commonly associated with unsharp masking. Additionally, there exists a need to automatically estimate the optimal parameters for the sharpening filter dependent upon the parameters of the interpolation algorithm.

SUMMARY OF THE INVENTION

The present invention is directed to overcoming one or more of the problems set forth above. Briefly summarized, according to one aspect of the present invention, the invention comprises a method for enhancing a digital image channel, the method comprising steps of:

(a) providing a digital image channel having image pixels;

(b) providing interpolation parameter values;

(c) generating an interpolated digital image channel using the interpolation parameter values and the digital image channel;

(d) generating edge shaper parameter values from the interpolation parameter values; and (e) generating an enhanced digital image channel from the interpolated digital channel by applying an edge shaping algorithm controlled by the edge shaper parameter values.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of controlling the value of the central pixel of a digital image channel in accordance with a statistical characteristic of the region, e.g., driving the value of the central pixel either toward the local maximum or the local minimum of the region, except in the case where the central pixel is substantially midway between the local maximum and the local minimum. Consequently, edge transitions occur over a narrower range of pixels than in the input image, thus generating an image signal that appears to be sharper, or more in focus, than the original image. Moreover, since the output of the tone scale conversion is modified by the statistical characteristic, e.g., bounded by the local maximum and the local minimum of the region, systematic overshoot and undershoot at an edge boundary is diminished and the ringing artifact is not as noticeable.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such materials, components and elements known in the art. Given the description as set forth in the following specification, all software implementation thereof is conventional and within the ordinary skill in such arts.

The invention involves a sharpening filter algorithm called the edge shaper 4 that is adaptive to the morphology of an image, as based on one or more image characteristics calculated over a localized region of the image (as isolated by a two-dimensional window). The aforementioned sharpening filter has an operation defined by several parameter values, which will be described in detail hereinbelow. These parameter values are selected specifically for operation on interpolated images. Those skilled in the art of image processing recognize that interpolation involves the estimation of the values of a sampled image at positions between the samples. The present invention comprises an interpolation step followed by a sharpening filter step in which the sharpening parameter values are selected according to the parameters used for the image interpolation.

The sharpening filtering algorithm includes software for normalizing the tone scale conversion with a scaling function for the image statistic(s) over the localized region of a digital image and then using the scaled tone scale to reshape the structure of edges in the digital image. More specifically, the shape of the local tone scale function is ordinarily selected before processing the image, but the exact scaling and translation of the local tone scale operation is determined from the statistics in any localized region. Accordingly, after the region is isolated, implementation of the algorithm includes identifying a desired statistical characteristic from the local region, performing a local tone scale conversion that is normalized in relation to the statistical characteristic, and mapping the central pixel of the local region through the tone scale conversion to generate an enhanced central pixel value.

The sharpening filter algorithm is preferably practiced in a first mode by scaling the input pixel values to the local maximum and minimum for each region and then applying the scaled input values to a tone scale function with normalized coordinates; the output obtained by this conversion operation is then processed with an inverse of the scaling function (used to generate the input) to obtain the enhanced output value. The shape of the tone scale function may remain fixed over the image; however, it may be desirable to vary the shape of the tone scale function dependent upon the statistical characteristics of the region. Furthermore, while it may be typical to apply the normalized tone scale operation to substantially all the pixels in the digital image, it may be desirable to only apply the method to selected areas of the image.

Figure 1:
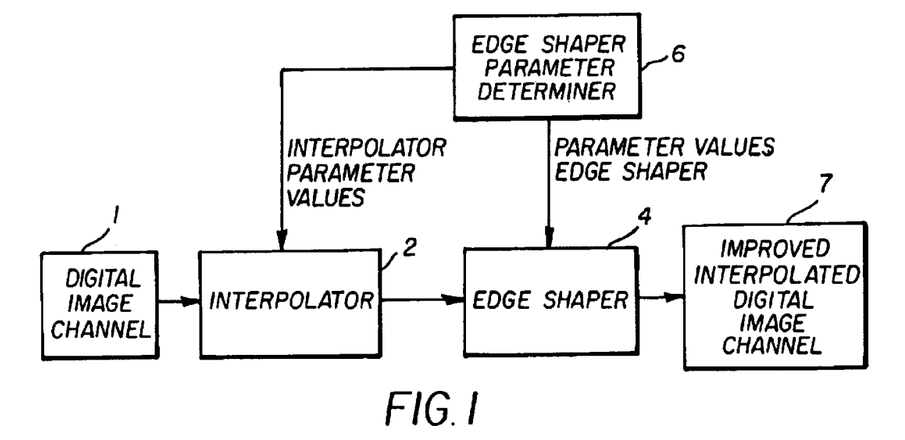
FIG. 1 is a block diagram illustrating an overview of a preferred embodiment of the present invention.

Referring to FIG. 1, there is illustrated a block diagram of a preferred embodiment for practicing the present invention.

It is instructive to note that the present invention utilizes a digital image which is initially captured as a two-dimensional array of red, green, and blue pixel values, or a two-dimensional array of single monochrome pixel values corresponding to light intensities. In this regard, a digital representation of an image, typically in RGB color space consisting of separate red, green, and blue image channels, may be transformed to a luminance-chrominance color space by a color space matrix transformation (not shown) resulting in a luminance image channel and two chrominance image channels, or the digital representation may be directly processed for enhancement as RGB signals. It facilitates understanding to note that the present invention typically operates on either the luminance channel in luminance-chrominance color space or individually on each color channel, for example red, green and blue, in RGB color space. Note that a digital image channel may comprise all of the pixel values in a digital image channel, of it may be comprised of merely a subset of the pixel values of a digital image channel. The transformation into a luminance-chrominance color space is well known in the art. After the present invention performs its operations, the digital image is preferably transformed back into RGB color space by an inverse color space matrix transformation (not shown), which permits, e.g., printing a hardcopy of the image or displaying a softcopy of the image on an output device.

It also facilitates understanding to note that the preferred embodiment of the present invention is described in reference to a relatively high resolution digital image channel having, e.g., dimensions of 480 pixels in height by 640 pixels in width, although the invention is similarly operative with image channels having greater or lesser image resolutions. Additionally, the present invention may reside in hardware or software in many different devices, for example digital cameras, scanners, personal computers, printers, or video cameras.

Again referring to FIG. 1, a digital image channel 1 is passed to the interpolator 2. Note that there are many methods of interpolating a digital image channel known to those skilled in the art. For example, bilinear interpolation, nearest neighbor interpolation, bicubic interpolation, and since interpolation are all well known interpolators 2 that are based on linear systems theory and may be utilized by the present invention. Likewise, there exist many nonlinear image interpolation algorithms, such as the method described by U.S. Pat. No. 6,005,983, issued on Dec. 21, 1999, inventors Anderson et al., titled "Image Enhancement by Non-Linear Extrapolation in Frequency Space". Any method of interpolation of an image may be utilized by the interpolator 2. In the preferred embodiment, bilinear interpolation is utilized by the interpolator 2. Those skilled in the art will recognize that the substitution of alternative methods of interpolation for the interpolator 2 does not constitute a novel variation from that described in the present invention.

Note that the number and value of the interpolator parameters will vary depending on the interpolation algorithm utilized by the interpolator 2. In the preferred embodiment where the interpolator 2 performs bilinear interpolation, the only interpolation parameter is F, which described the ratio of the new sampling rate to the original sampling rate of the digital image channel. For instance, if the image output from the interpolator 2 has resolution of 960 by 1280 and the image input to the interpolator 2 has a resolution of 480 by 640, the interpolation parameter F is 2. Note that it is assumed that the same F applies to both the rows and the columns of the digital image channel, although this is not a necessary assumption. The operation of the interpolator 2 is dependent upon the value(s) of the interpolation parameter(s). Note that an operator may set the value of the interpolation parameter(s), or the value of the interpolation parameter(s) may be set by another means.

The interpolation parameter values are also input to the edge shaper parameter determiner 6. The operation of the edge shaper parameter determiner 6 is to determine the optimal parameter settings for the edge shaper 4, which applies a sharpening filter to the output of the interpolator 2. The optimal parameters of the edge shaper 4 depend upon the parameters utilized by the interpolator 2. Thus the edge shaper parameter determiner 6 sets the value of the parameters that will control the operation of the edge shaper 4, based upon the parameters which controlled the interpolator 2.

In the preferred embodiment where the edge shaper 4 is a non-linear sharpening filter, the edge shaper parameter determiner 6 must output two or three edge shaper parameter values. A linear filter is a filter whose output value may be expressed as a linear combination of the values input to the filter. Filters which generate output values which cannot be expressed as a linear combination of the values input to the filters are referred to as non-linear filters. The interpolation parameter value(s) are input to the edge shaper parameter determiner 6. As previously mentioned, in the preferred embodiment the interpolation parameter value consists of a single parameter F, which corresponds to the ratio of the new sampling rate to the original sampling rate of the digital image channel.

In the preferred embodiment, the edge shaper parameter determiner 6 computes the following edge shaper parameter values:

W: The window size of the local region which is extracted by the region extractor 8. When F is an integer, W=2F+1. When F is not an integer, W is the odd integer nearest twice F. Note that the window size parameter W is linearly related to the interpolation factor F. Thus, W and F are linearly related. As the interpolation factor F is increased, the window size W is increased. This relationship between W and F ensures that the size of the window is proportional to the size of the image output from the interpolator 2.

γ: The slope of the local tone scale function generated by the tone scale function generator 64. In the preferred embodiment, γ=2.1 and is independent of the value of F.

D: Local dynamic range measure. This parameter is used in an alternative embodiment of the present invention (FIG. 3) where the modified pixel value output by the pixel modifier 12 is combined with the pixel value input to the pixel modifier 12 in order for the edge shaper 4 to have a greater effect on the edges of the digital image channel. D defines a measure of edge strength above which the modified pixel value receives a weight of 1.0 and the pixel value input to the pixel modifier 12 receives a weight of 0.0. In general, D=c/F, where c is a constant, preferable 100.

In the preferred embodiment, the aforementioned parameter values W,γ, and D, are computed once per digital image channel and then passed as an input to the edge shaper 4. Those skilled in the art of digital image processing will recognize that the parameter values may be derived in a manner dependent upon position in the digital image channel. However, such an extension to the preferred embodiment should be seen as an obvious extension to the present invention.

The edge shaper 4 modifies the edge contrast of edges in a digital image channel in such a way that the edges appear to have been in better focus. The edge shaper 4 performs this function by utilizing a highly nonlinear sharpening filter. The operation of the edge shaper utilized in the present invention has been described in detail in U.S. patent application Ser. No. 09/324,239, filed Jun. 2, 1999. The advantage of the nonlinear sharpening filter utilized by the edge shaper 4 is that the edges of a digital image channel appear sharper without introducing overshoot commonly associated with linear sharpening algorithms, such as unsharp masking. Note that unsharp masking may be utilized as the edge shaper 4, but the results will be inferior to the results of the preferred embodiment. Alternatively, other linear or non-linear methods of sharpening a digital image signal may be applied by the edge shaper 4. The output of edge sharper 4 is improved interpolated digital image channel 7.

In alternative embodiment wherein the edge sharper 4 is an unsharp mask (the operation and form of which is well known in the art), the edge shaper parameter values may be selected as:

W: The window size of the local region which is blurred to create the unsharp signal. In this embodiment, the lowpass filter used by the unsharp mask is simply a square filter with an odd number of pixels W on each side. Each coefficient of the lowpass filter is identically $1/W^2$. When F is an integer, W=2F +1. When F is not an integer, W is the odd integer nearest twice F.

β: The gain of the unsharp mask. This parameter is selected to be identically equal to 2, providing a doubling of the detail data resulting by subtracting the unsharp signal from the sharp (original) signal Note that when the edge shaper 4 is an unsharp mask, the edge shaper is also a linear filter, as is well known in the art of digital signal processing. Although unsharp masking of interpolated digital images is probably routinely performed, the primary advantage of the present invention is the coordination of the parameters of the unsharp masking to the interpolation parameters, which results in a consistently pleasing output. In addition, many image processing systems contain the capability for sharpening digital images using linear filters. Therefore this alternative embodiment can provide a simple solution toward providing a consistent appearance for interpolated digital images.

In the preferred embodiment, the aforementioned parameter values W, γ, and D, are computed once per digital image channel and then passed as an input to the edge shaper 4. Those skilled in the art of digital image processing will recognize that the parameter values may be derived in a manner dependent upon position in the digital image channel. However, such an extension to the preferred embodiment should be seen as an obvious extension to the present invention.

Figure 2:
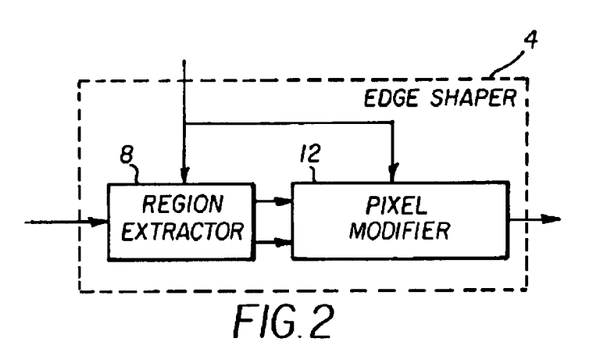
FIG. 2 is an exploded block diagram of the edge shaper 4 shown first in FIG. 1.

FIG. 2 illustrates an exploded block diagram of one embodiment of edge shaper 4. The edge shaper 4 consists of two operators. The first operator is the region extractor 8. The purpose of the region extractor 8 is to extract a region from the digital image channel input to the edge shaper 4 for processing by the pixel modifier 12. The region extractor 8 may individually extract every possible region of the image to undergo processing by the pixel modifier 12. Alternatively, the region extractor 8 may simply select certain regions of the digital image channel input to the edge shaper 4 to undergo processing by the pixel modifier 12. The local region that the region extractor 8 outputs is described by the edge shaper parameters which are output by the edge shaper parameter determiner. In the case of the present embodiment, the region is a square array of pixel values from the digital image channel. The number of pixels on each side of the square is determined by the parameter value of W. As previously mentioned, in the preferred embodiment, the value of W is determined by the edge shaper parameter determiner 6 to be equal to W=2F+1. Notice that in the preferred embodiment, it is assumed that the value of F is an integer. However, this need not be the case. When F is a non-integer, then W equals the odd integer nearest twice the value of F. The relationship between F and W ensures that any local region will cover a region corresponding to at least 4 pixel locations in the digital image channel that is input to the interpolator 2. Notice that the region extractor 8 outputs two items. The first output of the region extractor 8 is the value of the pixel which is undergoing processing. The second output of the region extractor 8 is the set of pixel values of the local region surrounding the pixel undergoing processing.

Again with reference to FIG. 2, the pixel modifier 12 accepts as inputs the value of the pixel undergoing processing and additionally the set of pixel values of the local region surrounding the pixel undergoing processing. The pixel modifier 12 only modifies the value of the pixel undergoing processing. The operation of the pixel modifier will be described in greater detail hereinbelow. The modified pixel value is output from the pixel modifier 12. The collection of modified pixel values output from the pixel modifier 12 together with the pixel values that were not modified by the pixel modifier constitute an improved interpolated digital image channel.

Figure 3:
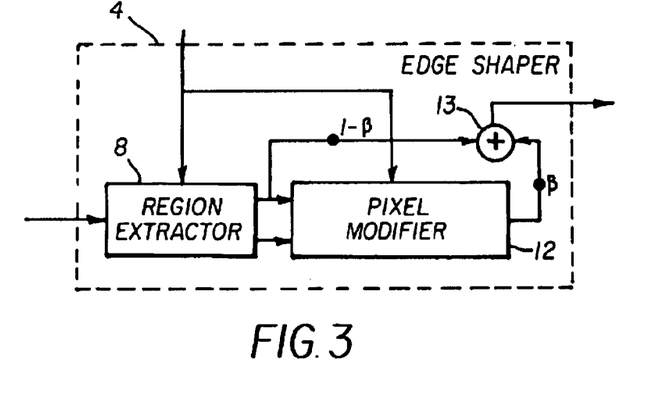
FIG. 3 is an exploded block diagram of an alternative embodiment of the edge shaper 4 shown in FIG. 1.

FIG. 3 illustrates an alternative embodiment of the edge shaper 4. In this embodiment, the region extractor 8 and the pixel modifier 12 are functionally identical to the previous descriptions of their operations. The purpose of the alternative embodiment is to allow the edge shaper 4 to have a large effect on the edge regions of the digital image channel, but only a small effect on the non-edge regions of the digital image channel. However, the modified pixel value output of the pixel modifier 12 is combined by means of a weighted average to the input pixel value in adder 13. The weight on the modified pixel value is represented as $\beta$, and the weight on the input pixel value is 1–$\beta$. Note that $\beta$ ranges from 0 to 1.0. The value of $\beta$ may vary for each location in the digital image channel. The value of $\beta$ is near or equal to 1.0 in edge regions of the digital image channel, and the value of $\beta$ is 0 or nearly 0 in the non-edge regions of the digital image channel.

The value of $\beta$ may be derived by any measure of edge magnitude or gradient magnitude. For example, the value of $\beta$ may be derived from the gradient magnitude of the local region. Alternatively, the value of $\beta$ may be derived from a measure of difference M between the local maximum and the local minimum of the local region, as determined by the local statistics determiner 10. For example,

| | |
|---|---|
| $\beta = 1$ | if M > D |
| $\beta = 2(M/D) - 1$ | if D/2 < M <= D |
| $\beta = 0$ | otherwise |

(where D is the local dynamic range measure output by the edge shaper parameter determiner 6.)

Figure 4:
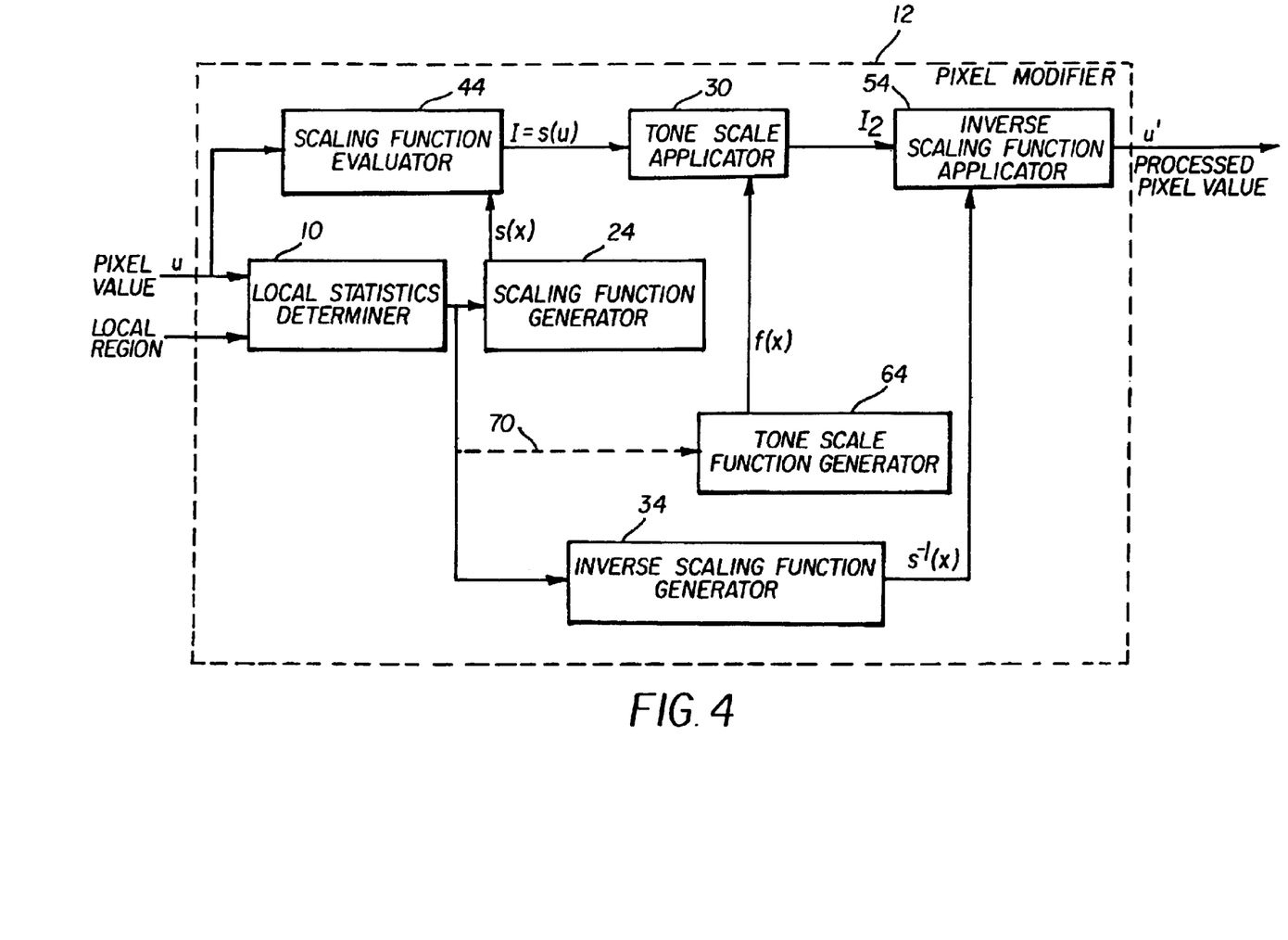
FIG. 4 is an exploded block diagram of the pixel modifier 12 shown in FIG. 2.
Figure 5:
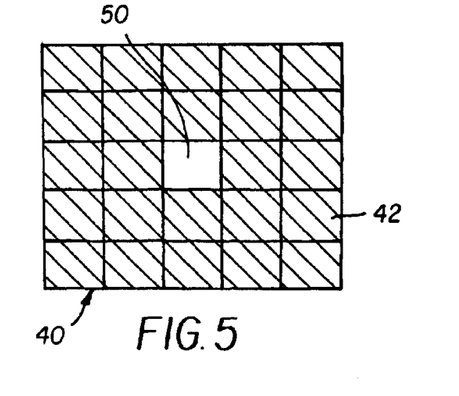
FIG. 5 is an example of a portion of an image showing a central pixel and the associated local region.
Figure 6:
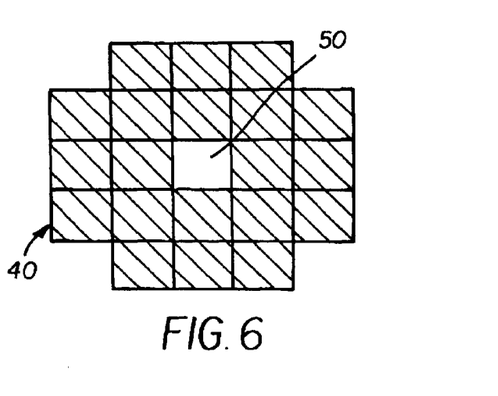
FIG. 6 is an alternative example of a portion of an image showing a central pixel and the associated local region.

With reference to FIGS. 4 and 5, therein is shown an exploded block diagram of the pixel modifier 12. The value of each input central pixel 50 of the digital representation of the digital image channel is first passed to a local statistics determiner 10 for calculating local statistics. The values of surrounding pixels 42 included within a local region 40 are also passed to the local statistics determiner 10. The local region 40 and the input pixel 50 constitute a spatial region of the digital image channel. (Note that FIG. 6 shows an alternative embodiment of the present invention wherein the local region 40 is a circular region surrounding the input pixel 50). In the preferred embodiment shown in FIG. 5, the local region about each input pixel 50 is defined as a square neighborhood centered on the input pixel for which the local statistics are being determined. As shown, the local region is a square neighborhood with 5 pixels on each side. The pixels 42 included within the local region 40 are illustrated as the 24 pixels (indicated by hatching) surrounding the input pixel 50 passed to the local statistics determiner 10. Those skilled in the art will recognize that the present invention will perform substantially the same operation with a large variety of local region sizes and shapes, and the usage (as claimed) of the term "central" to describe the processed pixel merely refers to a pixel having a local surround of pixels, rather than a pixel at the centroid of its local region.

In FIG. 4, the value of each central pixel 50 is input to the local statistics determiner 10 and a scaling function evaluator 44. In addition, the values of the pixels 42 in the local region are input to the local statistics determiner 10 in order to generate a statistical characteristic of the local region. A scaling function generator 24 uses the statistical characteristic to generate a scaling function s(x) that is applied to the scaling function evaluator 44 in order to normalize the value of each input pixel 50 and thereby generate a first intermediate value I. The statistical characteristic is also used by an inverse scaling function generator 34 to generate a function $s^{-1}(x)$ that is the inverse of the scaling function s(x). The first intermediate value I is then applied to a tone scale applicator 30, which maps the intermediate value I through a tone scale function f(x) provided by a tone scale function generator 64 in order to generate second intermediate value $I_2$. The output intermediate value $I_2$ from the tone scale applicator 30 is then applied to an inverse scaling function applicator 54, which generates a processed value u' in the system image space by using the inverse function $s^{-1}(x)$ provided by the inverse scaling function generator 34.

More specifically, the local statistics determiner 10 calculates several characteristics that describe the image data contained in the local region 40 and the input pixel 50. The local statistics could be any mathematical combination of the pixel values contained in the local region 40 and the input pixel 50. In the preferred embodiment, the local statistics determiner 10 determines two local statistics, the maximum and minimum pixel values from the local region 40 and the input pixel 50. As an alternative, the local statistics determiner 10 could determine the mean of the n maximum pixel values, and the mean of the m minimum pixel values, where n and m are integers much smaller than the number of pixels contained in the local region 40, for example, n=m=3. As will be described, these local statistics are utilized in the generation of the scaling function s(x) and the inverse scaling function $s^{-1}(x)$.

Figure 7:
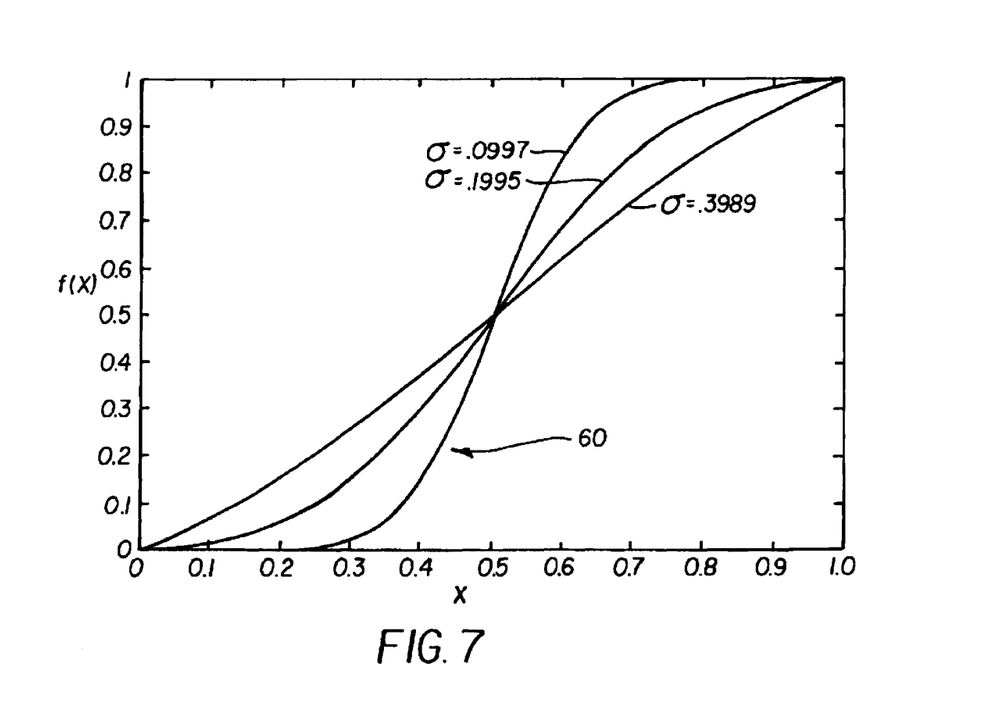
FIG. 7 is an example of several tone scale functions.

The local statistics determined by the local statistics determiner 10 are then passed to the scaling function generator 24 and the inverse scaling function generator 34. In the preferred embodiment, the scaling function may be represented with the following equation:

$$s(u) = \frac{u - N}{X - N}$$

where X represents the maximum pixel value from the local region 40 and N represents the minimum pixel value from the local region 40. The purpose of the scaling function is to modify the value of the central pixel 50 such that the modified pixel value may be used as an input to a tone scale function 60, as shown in FIG. 7. In the preferred embodiment, this tone scale function 60 is applied as a look-up-table (LUT). The effect of the scaling function is to normalize (i.e., compress) the interval [N X] of input values to an interval [0 1], as shown in FIG. 7.

In a similar manner, the inverse scaling function generator 34 creates the inverse scaling function $s^{-1}(u)$; the inverse scaling function $s^{-1}(u)$ may be represented by the following equation:

$$s^{-1}(u)=u(X-N)+N$$

The purpose of the inverse scaling function is to scale the output values obtained from the tone scale function 60 back to the interval [N X]. The scaling function and the inverse scaling function are indeed inverses, as it can easily be shown that $s^{-1}(s(u))=u$.

The value of the input pixel 50 is then passed to the scaling function evaluator 44 in order to generate an intermediate value $I=s(u)$, where I is the intermediate value, $s()$ is the scaling function, and u is the value of the input pixel 50. The output of the scaling function evaluator 44 is the intermediate value I. The intermediate value I is then passed to the tone scale applicator 30. The purpose of the tone scale applicator is to affect the contrast of the value of the input pixel 50 with respect to the local region 40. The tone scale applicator 30 modifies the intermediate value I, thereby creating the second intermediate value $I_2$. The tone scale applicator 30 modifies the intermediate value I with the tone scale function 60 (i.e., $f(x)$) (FIG. 7). Thus, the operation of the tone scale applicator may be expressed in the following equation: $I_2=f(I)$, where $I_2$ is the second intermediate value, $f()$ is the tone scale function, and I is the intermediate value output from the scaling function evaluator 44.

The tone scale function $f(x)$ is generated by the tone scale function generator 64. In the preferred embodiment, the tone scale function $f(x)$ is the sigmoid function, formed by integrating a Gaussian probability distribution function, and is well known in the art. The sigmoid function is fully characterized by the standard deviation σ of the Gaussian probability function that is integrated. The tone scale function $f(x)$ may be expressed by the following formula:

$$f(x) = \frac{1}{\sigma\sqrt{2\pi}} \int_{-\infty}^{x} \exp\left(\frac{-x^2}{2\sigma^2}\right) dx$$

In the preferred embodiment, the tone scale function is found by computing the summation of discrete samples of a Gaussian distribution, as shown in the following formula:

$$f(x) = \frac{\sum_{u=-a}^{u=a(2x-1)} \exp\frac{-x^2}{2\sigma^2}}{\sum_{u=-a}^{u=a} \exp\frac{-x^2}{2\sigma^2}}$$

where $2a$ is the number of samples in the LUT. In the preferred embodiment, a=50.

Notice that the slope of the tone scale function $f(x)$ evaluated at x=0.5 may be determined by the relationship:

$$\gamma = \frac{1}{\sigma\sqrt{2\pi}},$$

where γ is the slope of the sigmoid function evaluated at x=0.5, and the approximate slope of the summation described above, and σ is the standard deviation of the Gaussian probability function. When the value of γ>1.0, the operation of the present invention sharpens the digital image channel by reshaping the local structure of edges. When the value of γ is <1.0, the operation of the present invention tends to produce an image with a softer appearance than the input image. In the preferred embodiment γ=2.1 and σ=0.19. In the preferred embodiment, the tone scale function $f(x)$ is independent of the local statistics output from the local statistics determiner 10, and thus need be computed only one time per image channel, despite the number of pixels being processed.

FIG. 7 illustrates a variety of tone scale functions, one of which is shown as the tone scale function 60, and the associated standard deviations of the Gaussian probability function σ. Those skilled in the art will recognize that a wide variety of functions in addition to the sigmoid function will accomplish the goal of the tone scale applicator 30.

The second intermediate value $I_2$ output from the tone scale applicator 30 is passed to the inverse scaling function applicator 54. In addition, the inverse scaling function $s^{-1}(x)$ output from the inverse scaling function generator 34 is passed to the inverse scaling function applicator 54. The purpose of the inverse scaling function applicator 54 is to generate the processed pixel value u' from the second intermediate value $I_2$. The inverse scaling function applicator 54 generates the enhanced pixel value u' by evaluating the inverse scaling function:

$$u'=s^{-1}(I_2)$$

Substituting for $I_2$ and I, $$u'=s^{-1}(f\{s(u)\})$$

where $s^{-1}(x)$ represents the inverse scaling function, $f\{x\}$ represents the tone scale function, $s(x)$ represents the scaling function, u represents the value of the input pixel 50, and u' represents the value of the enhanced pixel.

Typically, the process for generating a processed pixel value u' is repeated for every pixel of the digital image in order to generate a processed pixel value corresponding to each pixel in the digital image. These processed pixel values, when considered as a collection, form a processed digital image channel. Alternatively, the process for generating a processed pixel value u' may repeated for a subset of every pixel of the digital image in order to generate a processed pixel value corresponding to a subset of pixels in the digital image. In the latter case, the subset, when considered as a collection, forms a processed image for a portion of the channel. In general, the parameters of the present algorithm may be adjusted in order to produce an enhanced digital image channel, with the appearance of greater edge contrast and more clarity than the digital image. Note that U.S. patent application Ser. No. 09/324,239, filed on Jun. 2, 1999, describes additional embodiments of the pixel modifier 12 that produced identical results to the preferred embodiment of the pixel modifier 12.

The sharpening algorithm according to the invention requires definition of two parameters: the size of the local region (which may be described by a window size for the sharpening filter) and the shape of the tone scale conversion function (which may be described by the slope of the tone scale function). As mentioned earlier, other suitable window sizes may be empirically determined without difficulty for other image resolutions; alternatively, a larger window may be acceptable in certain situations for a given resolution if the user is willing to accept increased artifacts in order to obtain the sharpening effect of the larger window.

There is a further trade-off in that noise, e.g., in flat regions such as sky, is also enhanced, and become more noticeable in appearance. Presumably, this occurs because the soft edges of the noise are shaped to appear more square, which increases the visibility of the noise. This problem may be reduced by varying the slope of the local tone scale, depending upon the difference between the maximum and minimum pixel values in any given region. In regions of small difference, the slope of the local tone scale may be nearly 1, producing very little change in the central pixel. In regions with a greater difference between local maximum and local minimum, the slope may be selected to be a value that produces the desired amount of reshaping to the edge. With proper tuning of the parameters, the algorithm can produce images with the appearance of very sharp edges. As a result, the parameters, i.e., window size and slope, need to be empirically determined with these trade-offs, i.e., between artifacts and image sharpening, in mind in order to maximize apparent sharpness of image detail while minimizing the aforementioned deleterious effects.

For example, in an alternative embodiment that, e.g., accounts for noise in flat regions in the image, the slope of the local tone scale may be adjusted so as to depend upon the difference between the maximum and minimum pixel values in any given region. Referring to the broken line 70 in FIG. 4 connecting the output of the local statistics determiner 10 with the tone scale function generator 64, note that the tone scale generator 64 may in these utilize the output of the local statistics determiner 10 in generating the tone scale function f(x). The characteristic shape of the local tone scale curve shape f(x) may be modified by the local statistics determined by the local statistics determiner 10. For example, in an effort to modify regions of the image containing large edges more than noisy image regions, the γ of the g(u) function may be forced to be greater in regions containing large edges than noise image regions. The γ of the curve shape f(x) may be determined by the following relationship:

$$\gamma=(X-N)/100+1$$

and σ may then be determined with the relationship:

$$\sigma = \frac{1}{\gamma\sqrt{2\pi}}$$

After the particular σ is chosen for the local tone scale curve shape f(x), the local tone scale function is generated in the manner previously described.

The invention has been described in detail with particular reference to preferred embodiments thereof, but it will be understood that variations and modifications can be effected within the spirit and scope of the invention.

PARTS LIST

1 digital image channel
2 interpolator
4 edge sharper
6 edge sharper parameter determines
7 improved interpolated digital image channel
8 region extractor
10 local statistics determiner
12 pixel modifier
13 adder
24 scaling function generator
30 tone scale applicator
34 inverse scaling function generator
40 local region
42 pixels
44 scaling function evaluator
50 pixels
54 inverse scaling function applicator
60 tone scale function
64 tone scale generator
70 broken line

What is claimed is:

1. A method for enhancing a digital image channel, the method comprising the following steps:
   (a) providing a digital image channel having image pixels;
   (b) providing interpolation parameter values;
   (c) generating an interpolated digital image channel using the interpolation parameter values and the digital image channel;
   (d) generating edge shaper parameter values from the interpolation parameter values; and
   (e) generating an enhanced digital image channel from the interpolated digital channel by applying a non-linear spatial filter edge shaping algorithm controlled by the edge shaper parameter values;
   further includes the step of identifying a pixel interest;
   calculating at least one statistical characteristic from image pixels corresponding to a region about said pixel of interest;
   using the statistical characteristic and the pixel of interest to calculate an enhanced output pixel;
   wherein the step of calculating the enhanced output pixel includes normalizing a predetermined tone scale function for the statistical characteristic in order to generate a normalized tone scale function; and
   applying the normalized tone scale function to the pixel of interest in order to generate the enhanced output pixel.

2. The method of claim 1, wherein the step (c) includes the step of applying a bilinear interpolation to the digital image channel.

3. The method of claim 1, wherein the step (c) includes the step of applying a bicubic interpolation to the digital image channel.

4. The method of claim 1, wherein the interpolation parameter values includes a factor related to the interpolation factor.

5. The method of claim 1 wherein the digital image channel of step (a) is a luminance channel.

6. The method of claim 1 wherein the edge shaper algorithm is a linear spatial filter.

7. The method of claim 1 wherein the statistical characteristic is a gradient value.

8. The method of claim 7 wherein the gradient value is derived from a maximum and minimum value from the region.

9. The method of claim 8 wherein the gradient value is computed from the difference between maximum and minimum image values of image pixels within the region.

10. The method of claim 1 wherein the tone scale function is a predetermined sigmoid function.

11. The method of claim 1 wherein the region about the pixel of interest is described by a window size parameter.

12. The method of claim 11 wherein the region about the pixel of interest is a square region having sides of length specified by the window size parameter.

13. The method of claim 12 wherein the interpolation parameter values includes a factor related to the interpolation factor and the window size parameter is linearly related to the interpolation factor.

14. The method of claim 13 wherein the window size parameter the odd integer nearest the value of twice the interpolation factor.

15. Apparatus for enhancing a digital image channel, comprising means for:
   (a) means for providing a digital image channel having image pixels;
   (b) means for providing interpolation parameter values;
   (c) means for generating an interpolated digital image channel using the interpolation parameter values and the digital image channel;
   (d) means for generating edge shaper parameter values from the interpolation parameter values; and
   (e) generating an enhanced digital image channel from the interpolated digital channel by applying an edge shaping algorithm controlled by the edge shaper parameter values;
      further includes the means for identifying a pixel of interest;
      means for calculating at least one statistical characteristic from image pixels corresponding to a region about said pixel of interest; and
      means for using the statistical characteristic and the pixel of interest to calculate an enhanced output pixel;
      wherein the means for calculating the enhanced output pixel includes means for normalizing a predetermined tone scale function for the statistical characteristic in order to generate a normalized tone scale function; and
      means for applying the normalized tone scale function to the pixel of interest in order to generate the enhanced output pixel.

16. The apparatus of claims 15 wherein the means (c) includes means for applying a bilinear interpolation to the digital image channel.

17. The apparatus of claim 15 wherein the means (c) includes means for applying a bicubic interpolation to the digital image channel.

18. The apparatus of claim 15 wherein the interpolation parameter values includes a factor related to the interpolation factor.

19. The apparatus of claim 15 wherein the digital image channel of means (a) is a luminance channel.

20. The apparatus of claim 15 wherein the edge shaper algorithm is a linear spatial filter.

21. The apparatus of claim 15 wherein the edge shaper algorithm is a non-linear spatial filter.

22. The apparatus of claim 15 wherein the statistical characteristic is a gradient value.

23. The apparatus of claim 22 wherein the gradient value is derived from a maximum and minimum value from the region.

24. The apparatus of claim 23 wherein the gradient value is computed from the difference between maximum and minimum image values of image pixels within the region.

25. The apparatus of claim 15 wherein the tone scale function is a predetermined sigmoid function.

26. The apparatus of claim 15 wherein the region about the pixel of interest is described by a window size parameter.

27. The apparatus of claim 26 wherein the region about the pixel of interest is a square region having sides of length specified by the window size parameter.

28. The apparatus of claim 27 wherein the interpolation parameter values includes a factor related to the interpolation factor and the window size parameter is linearly related to the interpolation factor.

29. The apparatus of claim 27 wherein the window size parameter the odd integer nearest the value of twice the interpolation factor.

30. A computer storage product for storing software for carrying out the method of claim 1 in a digital computer.

31. A computer storage product for storing software for carrying out the method of claim 2 in a digital computer.

32. A computer storage product for storing software for carrying out the method of claim 3 in a digital computer.

33. A computer storage product for storing software for carrying out the method of claim 4 in a digital computer.

34. A computer storage product for storing software for carrying out the method of claim 5 in a digital computer.

35. A computer storage product for storing software for carrying out the method of claim 6 in a digital computer.

36. A computer storage product for storing software for carrying out the method of claim 7 in a digital computer.

37. A computer storage product for storing software for carrying out the method of claim 8 in a digital computer.

38. A computer storage product for storing software for carrying out the method of claim 9 in a digital computer.

39. A computer storage product for storing software for carrying out the method of claim 10 in a digital computer.

40. A computer storage product for storing software for carrying out the method of claim 11 in a digital computer.

41. A computer storage product for storing software for carrying out the method of claim 12 in a digital computer.

42. A computer storage product for storing software for carrying out the method of claim 13 in a digital computer.

43. A computer storage product for storing software for carrying out the method of claim 14 in a digital computer.

* * * * *